(12) United States Patent
Kim et al.

(10) Patent No.: US 12,254,263 B2
(45) Date of Patent: Mar. 18, 2025

(54) METHOD, DEVICE, AND SYSTEM FOR ANALYZING UNSTRUCTURED DOCUMENT

(71) Applicant: 42Maru Inc., Seoul (KR)

(72) Inventors: Dong Hwan Kim, Seoul (KR); Hyun Ok Kim, Gwangmyeong-si (KR); Seong Woo Park, Seoul (KR); Jae Yeob Jung, Seoul (KR); Yo Han Moon, Seoul (KR); Min Sun Song, Seoul (KR)

(73) Assignee: 42Maru Inc., Seoul (KR)

( * ) Notice: Subject to any disclaimer, the term of this patent is extended or adjusted under 35 U.S.C. 154(b) by 29 days.

(21) Appl. No.: 17/643,451

(22) Filed: Dec. 9, 2021

(65) Prior Publication Data

US 2023/0177251 A1 Jun. 8, 2023

(30) Foreign Application Priority Data

Dec. 6, 2021 (KR) .......................... 10-2021-0172587

(51) Int. Cl.
*G06F 40/106* (2020.01)
*G06F 16/332* (2019.01)
*G06F 16/34* (2019.01)
*G06F 40/109* (2020.01)
(Continued)

(52) U.S. Cl.
CPC ........ *G06F 40/106* (2020.01); *G06F 16/3323* (2019.01); *G06F 16/34* (2019.01); *G06F 40/109* (2020.01); *G06F 40/186* (2020.01); *G06N 3/08* (2013.01)

(58) Field of Classification Search
CPC .. G06F 40/106; G06F 16/3323; G06F 40/109; G06F 40/186; G06F 16/34; G06N 3/08
See application file for complete search history.

(56) References Cited

U.S. PATENT DOCUMENTS 10,572,576 B1 * 2/2020 Marc-Aurele ........ G06F 40/279
2020/0285916 A1 9/2020 Wang et al.
2021/0240776 A1 8/2021 Jawagal et al.
(Continued)

FOREIGN PATENT DOCUMENTS

KR 10-2021-0085728 A 7/2021
KR 10-2021-0105764 A 8/2021

OTHER PUBLICATIONS

Extended European Search Report dated Nov. 11, 2022 in European Application No. 22185994.5.
(Continued)

*Primary Examiner* — Kyle R Stork
(74) *Attorney, Agent, or Firm* — Sughrue Mion, PLLC

(57) ABSTRACT

An unstructured document analysis method according to an embodiment includes: operations of acquiring unstructured document data including font characteristic data and document structure data, extracting text included in the unstructured document data on the basis of the font characteristic data or the document structure data, classifying the extracted text into a pre-classified item using a trained neural network model, acquiring a content query related to the content included in the unstructured document data and associated with the pre-classified item, and generating an answer to the content query on the basis of the extracted text classified into the item.

18 Claims, 13 Drawing Sheets

(51) Int. Cl.
    *G06F 40/186*     (2020.01)
    *G06N 3/08*       (2023.01)

(56) References Cited

U.S. PATENT DOCUMENTS

2021/0248420 A1* 8/2021 Zhong .................... G06V 10/82
2021/0377275 A1* 12/2021 Grønvik ................ H04L 63/101
2022/0207038 A1* 6/2022 Cenciotti .............. G06F 18/214

OTHER PUBLICATIONS

Office Action issued Oct. 10, 2024 in Korean Intellectual Property Office Application No. 10-2021-0172587.

* cited by examiner

| Standard item summary for share trading contract | | | template |
|---|---|---|---|
| target company | target company | [name of target company] | value |
| target share | a share type | common share/ preferred share | |
| | par value | [*] won | |
| | number of shares to be traded | [*] shares | |
| possession rate | possession rate | [*]% | key |
| trading amount | price per share | [*] won | |
| | total amount of trading | [*] won | |
| ... | ... | ... | |

FIG. 11

| item information | expected answer | predetermined condition |
|---|---|---|
| share type | common share | common share/preferred share |
| par value | 100 won | [A] won |
| number of shares to be traded | 5000 shares | [B] shares |
| possession rate | 35 won | [C]% |
| price per share | 75,000 won | [D] won |
| ... | ... | ... |

FIG. 13

METHOD, DEVICE, AND SYSTEM FOR ANALYZING UNSTRUCTURED DOCUMENT

CROSS-REFERENCE TO RELATED APPLICATION

This application claims priority to and the benefit of Korean Patent Application No. 10-2021-0172587, filed on Dec. 6, 2021, the disclosure of which is incorporated herein by reference in its entirety.

BACKGROUND

1. Field

The present disclosure relates to a method, device, and system for analyzing an unstructured document, and more particularly, to an unstructured-document analysis method, device, and system that extract text included in an unstructured document and classify the extracted text.

2. Discussion of Related Art

With the development of artificial intelligence technology, artificial intelligence technology is being used in various industries. In particular, in the field of language analysis technology, a technology for performing natural language analysis and predicting word sequences or sentence sequences by using a language model incorporating artificial intelligence technology is being actively researched.

However, in the case of unstructured documents, there are limitations to the analysis due to the diversity of the document format and the document structure, and also there is a problem that considerable time and cost are required while unstructured document data is processed to process the unstructured document into an operable form.

Accordingly, it is required to develop a new unstructured-document analysis method, device, and system that precisely analyze unstructured document data.

SUMMARY

An aspect of the present invention is to provide an unstructured document analysis method, an unstructured document analysis device, and an unstructured document analysis system for extracting text included in an unstructured document and classifying the extracted text by item.

Technical objects desired to be achieved in the present invention are not limited to the aforementioned objects, and other technical objects not described herein will be apparently understood by those skilled in the art from the following description and the accompanying drawings.

According to an aspect of the present disclosure, there is provided an unstructured document analysis method including operations of acquiring unstructured document data including font characteristic data and document structure data, extracting text included in the unstructured document data on the basis of the font characteristic data or the document structure data, classifying the extracted text into a pre-classified item using a trained neural network model, acquiring a content query related to the content included in the unstructured document data and associated with the pre-classified item, and generating an answer to the content query on the basis of the content query and the extracted text classified into the item.

According to another aspect of the present disclosure, there is provided an unstructured document analysis device including a transceiving unit configured to receive unstructured document data and a processor configured to extract text included in the unstructured document data, classify the extracted text into a pre-classified item, and generate an answer to a content query related to content included in the unstructured document data, wherein the processor acquires unstructured document data including font characteristic data and document structure data, extracts text included in the unstructured document data on the basis of the font characteristic data or the document structure data, classifies the extracted text into a pre-classified item using a trained neural network model, acquires a content query related to the content included in the unstructured document data and associated with the pre-classified item, and generates an answer to the content query on the basis of the extracted text classified into the item.

Solutions of the present invention are not limited to the above-mentioned solutions, and solutions that have not been mentioned will be clearly understood by those skilled in the art from the following description and the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 11 is a diagram showing an aspect of acquiring a content query on the basis of template data according to an embodiment of the present disclosure;

FIG. 13 is a diagram showing an aspect of generating an answer to a content query according to an embodiment of the present disclosure.

DETAILED DESCRIPTION OF EXEMPLARY EMBODIMENTS

Figure 1:
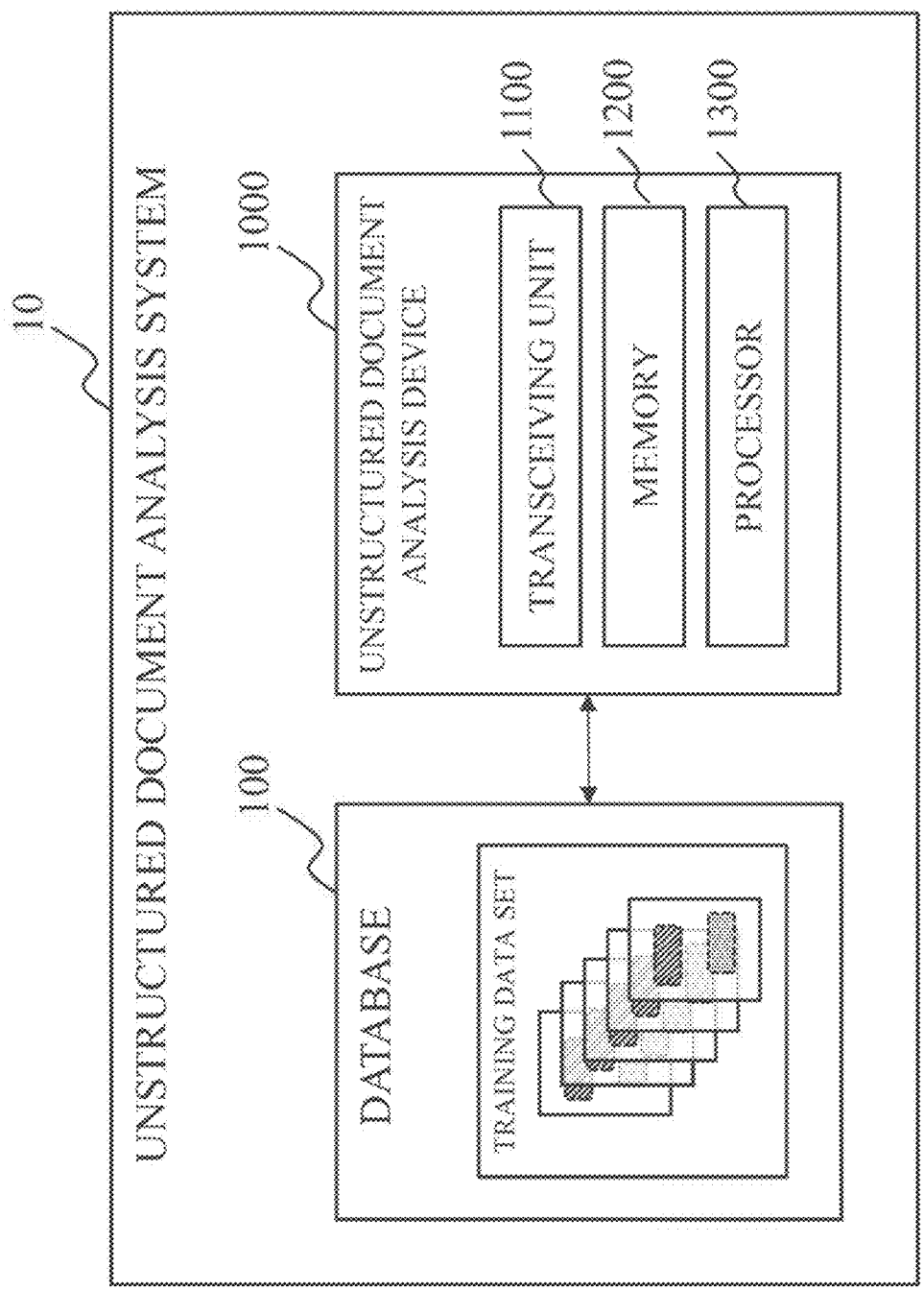
FIG. 1 is a schematic diagram of an unstructured document analysis system according to an embodiment of the present disclosure.

The above objects, features, and advantages of the present disclosure will become more apparent from the following detailed description taken in conjunction with the accompanying drawings. However, since the present disclosure may be variously modified and have several exemplary embodiments, specific exemplary embodiments will be shown in the accompanying drawings and described in detail.

Like reference numerals refer to like elements throughout the specification. Further, like reference numerals will be used to designate like elements within the same scope shown in the drawings of the embodiments, and a relevant description thereof will be omitted.

Detailed descriptions about well-known functions or configurations associated with the present invention will be omitted in order not to unnecessarily obscure the subject matter of the present invention. Also, ordinal numbers (e.g., first, second, etc.) used in the following description are merely identification symbols for distinguishing one element from another element.

The suffixes "module" and "unit" for elements used in the following embodiments are given or used interchangeably only for facilitation of preparing this specification, and thus they are not assigned a specific meaning or function.

As used herein, the singular forms "a," "an," and "one" are intended to include the plural forms as well, unless the context clearly indicates otherwise.

It should be further understood that the terms "comprises" and/or "comprising" used herein specify the presence of stated features or components, but do not preclude the presence or addition of one or more other features or components.

In the drawings, the components may be exaggerated or reduced in size for convenience of description. For example, since the sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in the order opposite to the described order.

In the following embodiments, when elements are connected to each other, the elements are connected to each other not only directly but also indirectly with other elements interposed therebetween.

For example, in the following embodiments, when elements are electrically connected to each other, the elements are electrically connected to each other not only directly but also indirectly with other elements interposed therebetween.

According to an aspect of the present disclosure, there is provided an unstructured document analysis method including operations of acquiring unstructured document data including font characteristic data and document structure data, extracting text included in the unstructured document data on the basis of the font characteristic data or the document structure data, classifying the extracted text into a pre-classified item using a trained neural network model, acquiring a content query related to the content included in the unstructured document data and associated with the pre-classified item, and generating an answer to the content query on the basis of the extracted text classified into the item.

The operation of classifying the extracted text into a pre-classified item may include operations of inputting the extracted text into an input layer of the neural network model, acquiring an output value output through an output layer of the neural network model, the output value being a probability that the extracted text will be related to at least one item, and allocating the extracted text to the at least one item on the basis of the output value.

The neural network model may be trained by acquiring training data through the input layer, outputting an output value through the output layer, and adjusting a parameter of a node included in the neural network model on the basis of the output value and a label related to an item allocated to reference text included in the training data.

The font characteristic data may include data related to at least one of a font size, a font thickness, a font shape, a font position, a font writing direction, a font color, and a font format, and the document structure data may include data related to at least one of text, an image, a table of contents, a table, a graph, a drawing, a list, a creator, a header, a footer, a query, an answer, a title, and the level of title.

The operation of extracting text may include operations of classifying the unstructured document data into a title sector or a body sector according to whether the font characteristic data satisfies a predefined rule and extracting text included in the classified sector.

The operation of classifying the unstructured document data into a title sector or a body sector may include an operation of classifying the unstructured document data as the title sector when the font characteristic data satisfies a first predefined rule and classifying the unstructured document data into the body sector when the font characteristic data satisfies a second predefined rule, and the first rule and the second rule may be rules related to font characteristics.

The operation of acquiring a content query may include operations of acquiring a user input for selecting at least one candidate content query among a plurality of candidate content queries and acquiring a candidate content query corresponding to the user input as the content query.

The operation of acquiring a content query comprises operations of acquiring template data for summarizing the unstructured document data, the template data including a key to which item information corresponding to the pre-classified item is allocated and a value to which the answer to the content query is to be allocated, and recognizing the item information allocated to the key and acquiring the content query on the basis of the item information.

The operation of generating an answer to the content query may include operations of acquiring an expected answer to the content query on the basis of the extracted text allocated to the item and determining that the expected answer is the answer to the content query on the basis of whether the form of the expected answer satisfies a predefined condition.

The operation of generating an answer to the content query may include an operation of allocating the answer to the value and generating an analysis template for the unstructured document data.

According to another aspect of the present disclosure, there is provided a computer-readable recording medium having a program recorded thereon to execute the unstructured document analysis method.

According to another aspect of the present disclosure, there is provided an unstructured document analysis device including a transceiving unit configured to receive unstructured document data and a processor configured to extract text included in the unstructured document data, classify the extracted text into a pre-classified item, and generate an answer to a content query related to content included in the unstructured document data, wherein the processor acquires unstructured document data including font characteristic data and document structure data, extracts text included in the unstructured document data on the basis of the font characteristic data or the document structure data, classifies the extracted text into a pre-classified item using a trained neural network model, acquires a content query related to the content included in the unstructured document data and associated with the pre-classified item, and generates an answer to the content query on the basis of the extracted text classified into the item.

Hereinafter, an unstructured document analysis method, device, and system of the present disclosure will be described with reference to FIGS. 1 to 13.

FIG. 1 is a schematic diagram of an unstructured document analysis system 10 according to an embodiment of the present disclosure. The unstructured document analysis system 10 according to an embodiment of the present disclosure may include a database 100 and an unstructured document analysis device (or an unstructured document analysis server) 1000 (hereinafter referred to as an unstructured document analysis device).

The database 100 may store any data related to the unstructured document analysis system 10. As an example, the database 100 may store a training data set for training a neural network model. Here, the training data set may include unstructured document data and label information in which content included in the unstructured document data is allocated to a value corresponding to a pre-classified item. As another example, the database 100 includes arbitrary execution data for executing the trained neural network model, which includes parameter information of the neural network model, and/or various types of data that can be used to analyze an unstructured document, which includes various kinds of unstructured document data included in the unstructured document and/or pre-classified item information or preset conditions required for analyzing the unstructured document. However, this is only an example, and any data for analyzing the unstructured document may be stored in the database 100 in any suitable manner.

Also, the unstructured document analysis device 1000 according to an embodiment of the present disclosure may acquire the unstructured document data and extract text included in the unstructured document data on the basis of the unstructured document data. Also, the unstructured document analysis device 1000 may be configured to classify the extracted text into the pre-classified item. For example, the unstructured document analysis device 1000 may allocate the extracted text to the pre-classified item using the trained neural network model. Also, the unstructured document analysis device 1000 may acquire a content query related to the content included in the unstructured document data and generate an answer to the content query. In this case, the content query may be associated with the pre-classified item, and the unstructured document analysis device 1000 may generate the answer to the content query on the basis of the extracted text allocated to the pre-classified item associated with the content query.

The unstructured document analysis device 1000 according to an embodiment of the present disclosure may include a transceiving unit 1100, a memory 1200, and a processor 1300.

The transceiving unit 1100 of the unstructured document analysis device 1000 may perform communication with any external device or an external server by including the database 100 and/or a user terminal. For example, through the transceiving unit 1100, the unstructured document analysis device 1000 may acquire any execution data for executing a training data set or a trained neural network model from the database 100. Also, through the transceiving unit 1100, the unstructured document analysis device 1000 may acquire unstructured document data to be analyzed. Also, through the transceiving unit 1100, the unstructured document analysis device 1000 may request analysis of unstructured document data from a user terminal or may acquire a user input related to a content query from a user terminal.

Also, through the transceiving unit 1100, the unstructured document analysis device 1000 may access a network to transmit or receive various kinds of data. The transceiving unit 1100 may largely include a wired-type unit and a wireless-type unit. Since the wired-type unit and the wireless-type unit each have advantages and disadvantages, in some cases, the unstructured document analysis device 1000 may be provided with both the wired-type unit and the wireless-type unit. Here, the wireless-type unit may mainly use a wireless personal area network (WPAN)-based communication scheme, such as Wi-Fi. Alternatively, the wireless-type unit may use a cellular communication scheme, for example, Long-Term Evolution (LTE) or a 5G communication scheme. However, a wireless communication protocol is not limited to the above example, and it is possible to use any appropriate wireless-type communication scheme. A representative example of the wired-type unit may be local area network (LAN) or universal serial bus (USB) communication, and other communication schemes are possible.

The memory 1200 of the unstructured document analysis device 1000 may store various kinds of information. Various kinds of data may be temporarily or semi-permanently stored in the memory 1200. Examples of the memory 1200 may include a hard disk drive (HDD), a solid-state drive (SSD), a flash memory, a read-only memory (ROM), a random access memory (RAM), etc. The memory 1200 may be built into, or detachable from, the unstructured document analysis device 1000. Various kinds of data necessary for the operation of the unstructured document analysis device 1000 may be stored in the memory 1200 in addition to an operating system for driving the unstructured document analysis device 1000 or a program for operating each element of the unstructured document analysis device 1000.

The processor 1300 controls the overall operation of the unstructured document analysis device 1000. For example, the processor 1300 may control the overall operation of the unstructured document analysis device 1000, including an operation of acquiring unstructured document data, an operation of extracting text from the unstructured document data, an operation of allocating the extracted text to a pre-classified item, an operation of acquiring a content query, and/or an operation of generating an answer to the content query, which will be described below. Specifically, the processor 1300 may load a program for the overall operation of the unstructured document analysis device 1000 from the memory 1200 and execute the program. The processor 1300 may be implemented as an application processor (AP), a central processing unit (CPU), a microcontroller unit (MCU) or the like in hardware, software, or a combination thereof. In this case, the processor 1300 may be implemented in hardware and provided in the form of an electronic circuit for processing an electrical signal to perform a control function and may be implemented in software and provided in the form of a program or code for driving a hardware circuit.

Meanwhile, although not shown in FIG. 1, the unstructured document analysis device 1000 may further include at least one accelerator. For example, the unstructured document analysis device 1000 may further include a graphics processing unit (GPU) as an accelerator used for training and inferring a neural network model. As another example, the unstructured document analysis device 1000 may further include a tensor processing unit (TPU) as an accelerator when the cloud is used. However, this is only an example, and the unstructured document analysis device 1000 may further include various kinds of accelerators such as a field-programmable gate array (FPGA) or a dedicated accelerator chip. By including an accelerator, advantageously, it is possible to secure computational processing capacity and improve computation speed.

Hereinafter, the unstructured document analysis method, the unstructured document analysis device 1000, and the unstructured document analysis system 10 according to an embodiment of the present disclosure will be described in more detail with reference to FIGS. 2 to 13.

Figure 2:
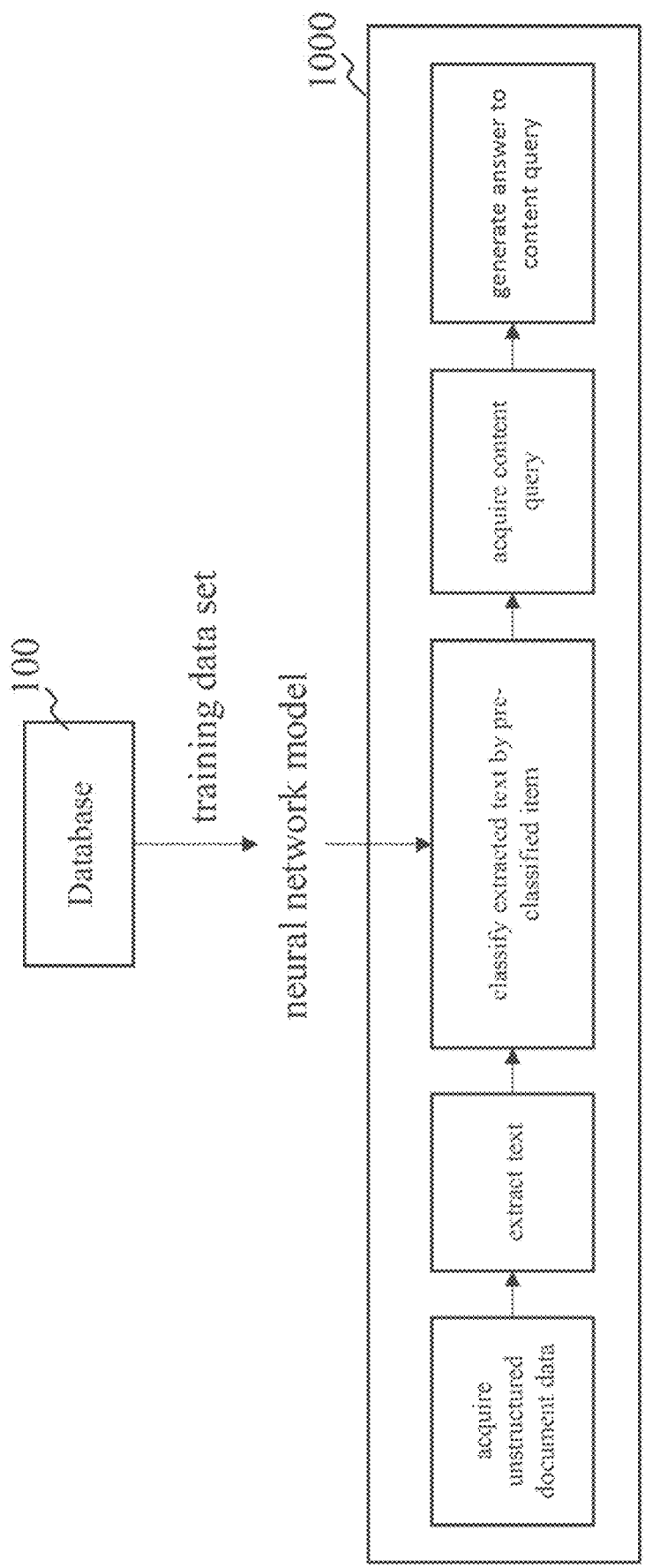
FIG. 2 is a diagram showing operations of an unstructured document analysis device according to an embodiment of the present disclosure.

FIG. 2 is a diagram showing operations of the unstructured document analysis device 1000 according to an embodiment of the present disclosure.

The unstructured document analysis device 1000 according to an embodiment of the present disclosure may acquire unstructured document data. In this case, the unstructured document data may encompass any data related to unstructured documents, including font characteristic data and/or document structure data.

As an example, the unstructured document analysis device 1000 may acquire unstructured document data related to an unstructured document on the basis of a user input for uploading or inputting the unstructured document through a user terminal.

Also, the unstructured document analysis device 1000 according to an embodiment of the present disclosure may extract text included in the unstructured document data. Specifically, the unstructured document analysis device 1000 may extract text from the unstructured document data using font characteristic data or document structure data included in the unstructured document data. For example, the unstructured document analysis device 1000 may classify the unstructured document data into a title sector and/or a body sector according to whether the font characteristic data included in the unstructured document data satisfies a predefined rule and may extract text for each classified sector. As another example, the unstructured document analysis device 1000 may classify the unstructured document data into a header sector, a footer sector, a table sector, a graph sector, a list sector, and/or a chart sector according to whether the document structure data included in the unstructured document data satisfies a predefined rule and may extract text for each sector.

Meanwhile, the text may encompass a character string included in the unstructured document data and any type of data (e.g., a vector, a matrix, or the like) obtained by arbitrarily processing a character string.

Figure 3:
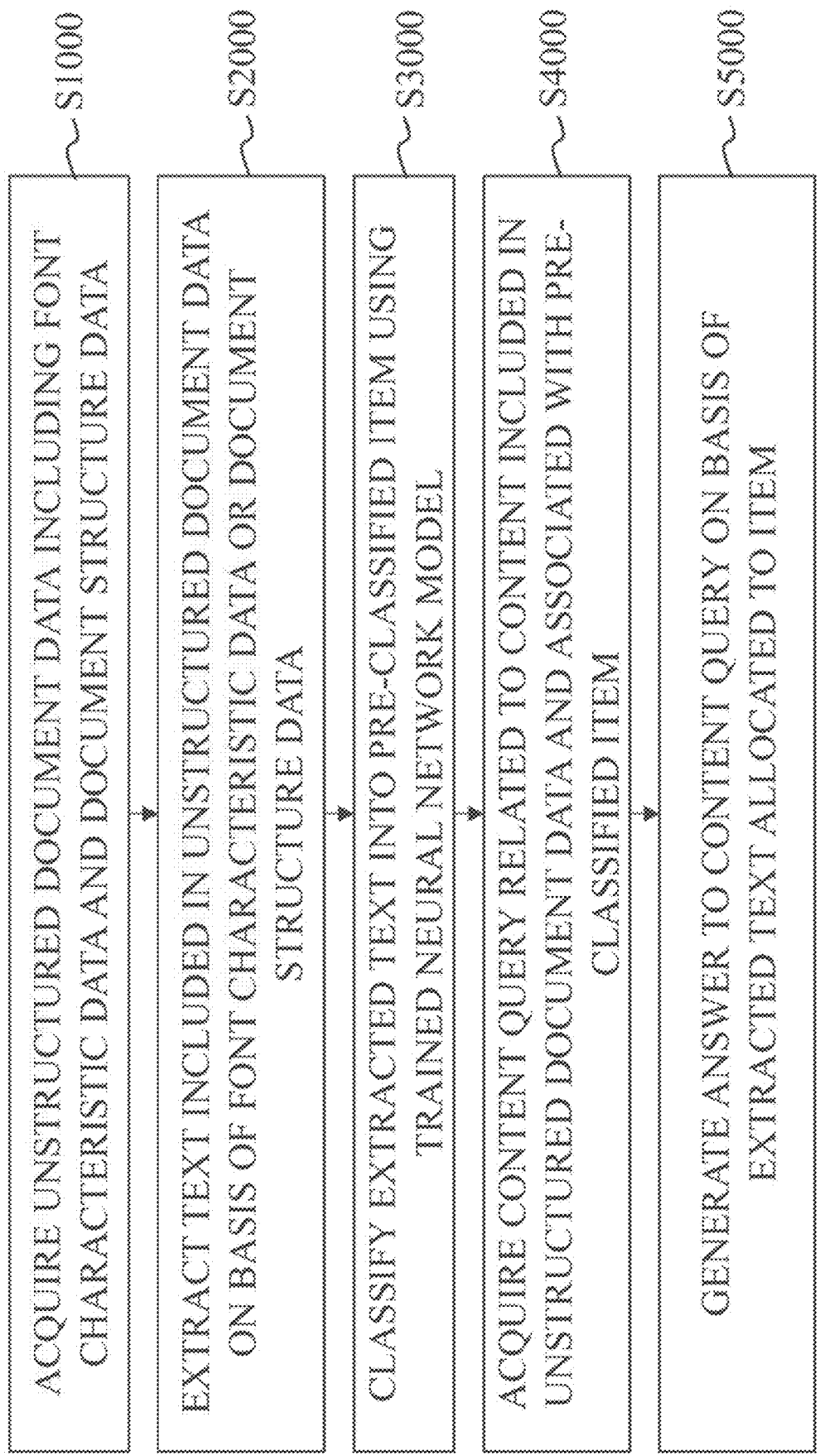
FIG. 3 is a flowchart illustrating an unstructured document analysis method according to an embodiment of the present disclosure.

The text extraction will be described in more detail with reference to FIGS. 3 and 4.

Also, the unstructured document analysis device 1000 according to an embodiment of the present disclosure may perform an operation of classifying the extracted text by pre-classified item or allocating the extracted text to a pre-classified item. Specifically, the unstructured document analysis device 1000 may classify the extracted text by pre-classified item using a trained neural network model.

The neural network model may be trained using training data including document data and label information related to an item allocated to text included in the document data. Specifically, the neural network model may be trained by acquiring training data through an input layer, outputting a predictive value through an output layer, and adjusting a parameter of a node included in the neural network model on the basis of the predictive value and label information. The trained neural network model may output an output value approximate to the label information related to the pre-classified item.

Accordingly, the unstructured document analysis device 1000 may input unstructured document data (or extracted text) to the input layer of the trained neural network model and acquire an output value to be output through the output layer of the neural network model. In this case, the output value may be a probability that the extracted text will be allocated to at least one pre-classified item among the pre-classified items or may be a value indicating an item with the highest probability. Also, the unstructured document analysis device 1000 may allocate the extracted text to at least one item on the basis of the output value.

The allocation of the extracted text to the pre-classified item will be described in more detail with reference to FIGS. 5 to 7.

Also, the unstructured document analysis device 1000 according to an embodiment of the present disclosure may acquire a content query. For example, the unstructured document analysis device 1000 may acquire a content query on the basis of a user input for selecting or inputting the content query through a user terminal. As another example, the unstructured document analysis device 1000 may acquire template data and acquire a content query from the template data. Specifically, the temperate data may include a key related to item information corresponding to the pre-classified item and a value to which an answer to the content query is to be allocated. In this case, the unstructured document analysis device 1000 may acquire item information related to the pre-classified item allocated to the key and may acquire the content query associated with the pre-classified item on the basis of the item information.

The acquisition of the content query will be described in more detail with reference to FIGS. 8 to 11.

Also, the unstructured document analysis device 1000 according to an embodiment of the present disclosure may perform an operation of generating an answer to the content query. Specifically, the unstructured document analysis device 1000 may be implemented to analyze the content query using machine reading comprehension (MRC) technology and determine an answer to the content query. The MRC refers to a technology that analyzes a random problem using an artificial intelligence algorithm and finds an optimal answer to the problem.

For example, the unstructured document analysis device 1000 may generate the answer to the content query on the basis of the content query and the extracted text allocated to the pre-classified item. Specifically, the unstructured document analysis device 1000 may acquire information on the pre-classified item associated with the content query by analyzing the content query and may generate the answer to the content query using the extracted text allocated to the pre-classified item.

As another example, the unstructured document analysis device 1000 may be implemented to perform an operation of verifying the generated answer. Specifically, the unstructured document analysis device 1000 may acquire an expected answer to the content query on the basis of the extracted text allocated to the pre-classified item. In this case, the unstructured document analysis device 1000 may be implemented to determine that the expected answer is the answer to the content query on the basis of whether the form of the expected answer satisfies a predefined condition. For example, when the content query is for a specific date, the predefined condition may be in the form of "$A^{th}$ month, $B^{th}$ day." In this case, when the form of the expected answer satisfies the predefined condition, the unstructured document analysis device 1000 may determine that the expected answer is the answer to the content query. On the other hand, when the form of the expected answer does not satisfy the predefined condition, the unstructured document analysis device 1000 may be implemented not to determine that the expected answer is the answer to the content query.

The generation of the answer to the content query will be described in more detail with reference to FIGS. 11 to 13.

Also, the unstructured document analysis device 1000 according to an embodiment of the present disclosure may perform an operation of generating an arbitrary form of a template or an arbitrary table on the basis of the analysis result for the unstructured document data. For example, the unstructured document analysis device 1000 may generate a template with the summarized unstructured document data by allocating the answer to the content query to the above-described value of the template data. However, this is only an example, and the unstructured document analysis device 1000 may be implemented to visualize a result of analyzing an unstructured document in an arbitrary form using any appropriate method.

The unstructured document analysis method according to an embodiment of the present disclosure will be described in more detail with reference to FIG. 3. FIG. 3 is a flowchart illustrating the unstructured document analysis method according to an embodiment of the present disclosure.

The unstructured document analysis method according to an embodiment of the present disclosure may include operations of acquiring unstructured document data including font characteristic data and document structure data (S1000), extracting text included in the unstructured document data on the basis of the font characteristic data or the document structure data (S2000), classifying the extracted text into a pre-classified item using a trained neural network model (S3000), acquiring a content query related to content included in the unstructured document data and associated with the pre-classified item (S4000), and generating an answer to the content query on the basis of the extracted text allocated to the item (S5000).

In the operation of acquiring unstructured document data including font characteristic data and document structure data (S1000), an unstructured document analysis device 1000 may acquire the unstructured document data. The unstructured document data may encompass any data related to unstructured documents, including font characteristic data and/or document structure data.

For example, the unstructured document analysis device 1000 may acquire the unstructured document data on the basis of a user input for uploading or inputting an unstructured document through a user terminal.

Figure 4:
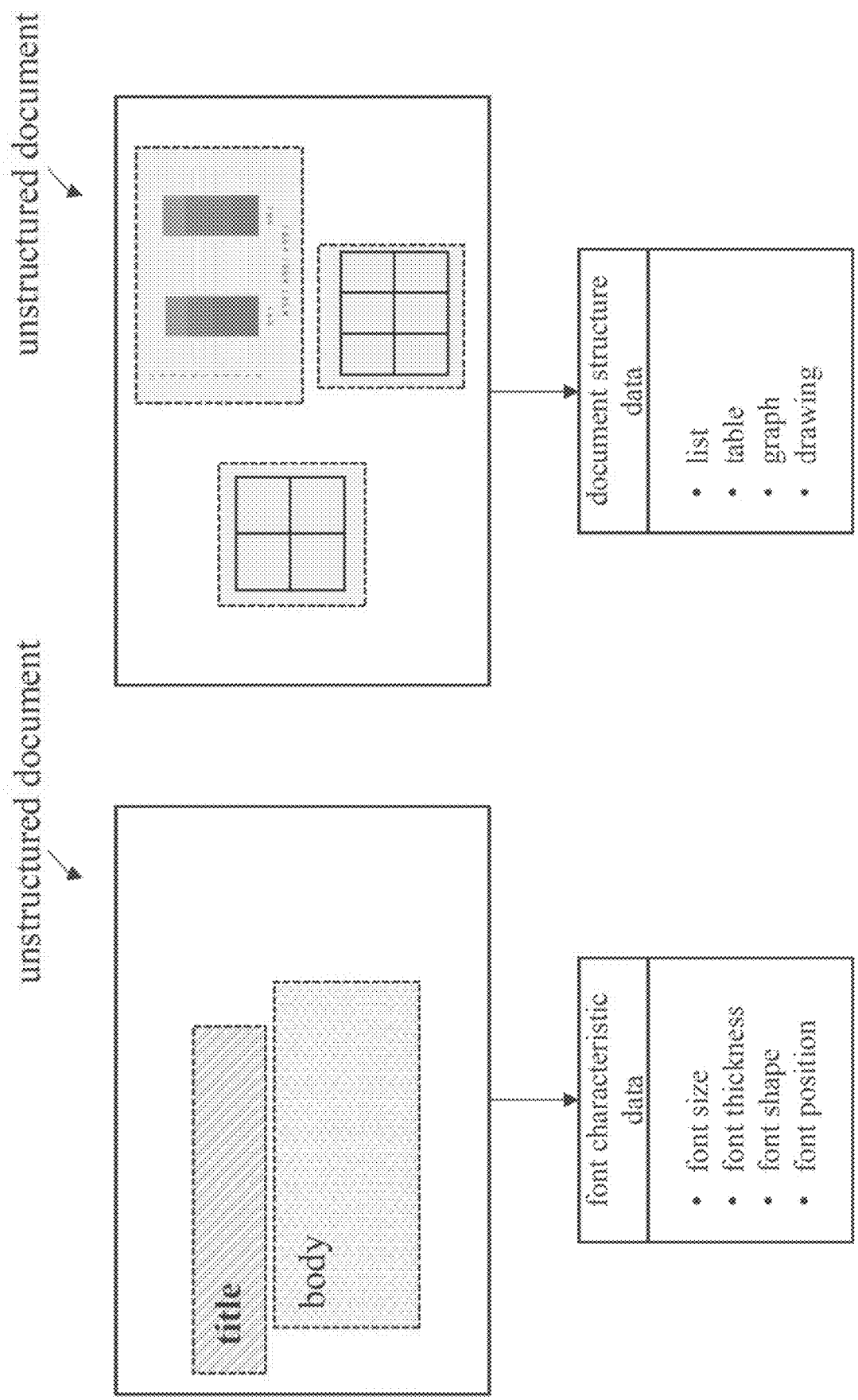
FIG. 4 is a diagram illustrating unstructured document data according to an embodiment of the present disclosure.

FIG. 4 is a diagram illustrating unstructured document data according to an embodiment of the present disclosure. According to an embodiment of the present disclosure, the unstructured document data may include font characteristic data and document structure data.

The font characteristic data may encompass any data related to text included in an unstructured document including a font size, a font thickness, a font shape, a font position, a font writing direction (e.g., a horizontal direction or a vertical direction), a font color, and/or a font format (e.g., bold, italic, underline, capitalized) included in the unstructured document. For example, the font size of text corresponding to a title item of the unstructured document may be a first size, and the font size of text corresponding to a body item of the unstructured document may be a second size. Alternatively, the font thickness of the text corresponding to the title item of the unstructured document may be a first value, and the font thickness of the text corresponding to the body item of the unstructured document may be a second size. The unstructured document analysis device 1000 according to an embodiment of the present disclosure may acquire font characteristic data (e.g., a font size, a font thickness, a font shape, a font position, a font writing direction, a font color, and/or a font format) included in the unstructured document and may be implemented to extract the text included in the unstructured document using the font characteristic data, as will be described below.

The document structure data may encompass structural data of content included in the unstructured document, including text, images, a table of contents, tables, graphs, drawings, lists, a creator, a header, a footer, a query, an answer, a title, and/or the level of title included in the unstructured document. The unstructured document analysis device 1000 according to an embodiment of the present disclosure may detect a sector corresponding to text, images, a table of contents, tables, graphs, drawings, lists, a creator, a header, a footer, a query, an answer, a title, and/or the level of title included in the unstructured document on the basis of the document structure data included in the unstructured data and extract the text or images included in the detected sector.

For example, in the operation of extracting text included in the unstructured document data on the basis of the font characteristic data or the document structure data (S2000), the unstructured document analysis device 1000 may classify a title sector and/or a body sector according to whether the font characteristic data included in the unstructured document data satisfies a predefined rule and extract text included in the classified sector. Specifically, the rule related to the font characteristic data may be preset.

As an example, conditions related to font characteristics generally used in the body sector may be preset. In this case, the unstructured document analysis device 1000 compares the font characteristic data included in the unstructured document data and the conditions for the font characteristics related to the body sector. When the font characteristic data matches the preset font characteristic conditions, the unstructured document analysis device 1000 may determine that the corresponding sector is the body sector and may store the font characteristic data of the corresponding sector. Also, the unstructured document analysis device 1000 may detect a sector that satisfies a condition related to the title sector, such as a sector adjacent to the sector determined as the body sector or a sector starting with a number or capital letter, classify the detected sector as the title sector, and store font characteristic data of the classified title sector. Also, the unstructured document analysis device 1000 may detect a sector that satisfies a condition related to the title sector, such as a sector adjacent to the classified title sector (e.g., a sector positioned in front of the title sector) or a sector starting with a number or capital letter and may classify the detected title sector as a parent title sector. Thus, the unstructured document analysis device 1000 may acquire level information of a title. The unstructured document analysis device 1000 may detect the above-described body sector, title sector, and/or parent title sector and extract text included in each sector.

As an example, a rule for defining the corresponding text as the character string corresponding to the title sector when the font size of the extracted text is larger than a first size or defining the corresponding text as the character string corresponding to the body sector when the font size of the extracted text is smaller than a second size may be preset. In this case, when the font characteristic data includes font size data greater than the first size, the unstructured document analysis device 1000 may classify the corresponding character string as the title sector and extract the text included in the title sector. Also, when the font characteristic data includes font size data smaller than the second size, the unstructured document analysis device 1000 may classify the corresponding character string as the body sector and extract the text included in the body sector.

As another example, a rule for defining the corresponding text as the character string corresponding to the title sector when the font thickness is larger than a first thickness or defining the corresponding text as the character string corresponding to the body sector when the font thickness is smaller than a second thickness may be preset. In this case, when the font characteristic data includes font thickness data greater than the first thickness, the unstructured document analysis device 1000 may classify the corresponding character string as the title sector and extract the text included in the title sector. Also, when the font characteristic data includes font thickness data smaller than the second thickness, the unstructured document analysis device 1000 may classify the corresponding character string as the body sector and extract the text included in the body sector. However, this is only an example, and the unstructured document analysis device 1000 may classify sectors included in the unstructured document data through an arbitrary rule related to the font characteristic data (e.g., a font size, a font thickness, a font shape, a font position, a font writing direction, a font color, and/or a font format) and extract text included in the sectors.

In the operation of extracting text included in the unstructured document data on the basis of the font characteristic data or the document structure data (S2000), the unstructured document analysis device 1000 may classify some data included in the unstructured document data as a table-of-contents sector according to whether the unstructured document data satisfies a predefined rule and extract text of the classified table-of-contents sector. As an example, the unstructured document analysis device 1000 may detect a start character string of the table-of-contents sector (e.g., the title of the table of contents) through a first predefined rule and may detect a content sector of the table-of-contents sector through a second predefined rule. Specifically, a character string generally used as the title of the table of contents may be pre-designated as the first rule. For example, "Content," "Table of Contents," and/or "Index" are commonly used as the title of the table of contents. Accordingly, the corresponding character strings may be preset in relation to the first rule, and the unstructured document analysis device 1000 may detect unstructured document data including the character strings that satisfy the first rule as the start sector of the table-of-contents sector or may determine the unstructured document data as the start sector of the table-of-contents sector. In addition, the table-of-contents sector generally includes page numbers and has dedicated pages. Accordingly, whether a number related to a page number exists at the end of lines included in the table-of-contents sector may be set as the second rule. Accordingly, when the number related to the page number exists at the end of the lines included in the table-of-contents sector (e.g., when the number related to the page number exists in a pre-classified portion of lines or greater), the unstructured document analysis device 1000 may determine the corresponding content as the content of the table-of-contents sector. On the other hand, when the number related to the page number does not exist at the end of the lines included in the table-of-contents sector (or when the number related to the page number does not exist in the pre-classified portion of lines or greater), the unstructured document analysis device 1000 may determine that the corresponding content is not the content of the table-of-contents sector.

Meanwhile, the table-of-contents sector may be included in the unstructured document over a plurality of pages. In this case, the unstructured document analysis device 1000 may be implemented to perform the above-described method on the plurality of pages and determine that a sector that does not first satisfy the second rule is the end sector of the table-of-contents sector. Also, the unstructured document analysis device 1000 may determine content between the start sector and the end sector of the table-of-contents sector as the final table-of-contents sector. However, this is only an example, and an arbitrary sector including the table-of-contents sector may be detected from the unstructured document data according to any suitable rule.

In the operation of extracting text included in the unstructured document data on the basis of the font characteristic data or the document structure data (S2000), the unstructured document analysis device 1000 may compare edges of neighbor pages included in the unstructured document, detect a header sector or a footer sector, and extract text of the header sector or the footer sector. Specifically, the unstructured document analysis device 1000 may compare candidate headers included in edger regions of the neighbor pages (e.g., a first page, a second page, and a third page) included in the unstructured document and compute the number of common elements. In this case, when the number of common elements between candidate headers included in the first page and the second page, the number of common elements between candidate headers included in the second page and the third page, and the number of common elements between candidate headers included in the first page and the third page are different, the unstructured document analysis device 1000 may not determine that the candidate headers included in the first to third pages are header sectors. On the other hand, when the number of common elements between candidate headers included in the first page and the second page, the number of common elements between candidate headers included in the second page and the third page, and the number of common elements between candidate headers included in the first page and the third page are equal, the unstructured document analysis device 1000 may determine that the candidate headers included in the first to third pages are header sectors.

Also, the unstructured document analysis device 1000 may be implemented to compare odd pages, compute the number of common elements for each odd page, and detect a header sector or a footer sector of the odd pages. Alternatively, the unstructured document analysis device 1000 may be implemented to compare even pages, compute the number of common elements for each even page, and detect a header sector or a footer sector of the even pages.

However, this is only an example, and the unstructured document analysis device 1000 may detect the header sector or footer sector of the unstructured document according to any suitable rule and extract text included in the corresponding sector.

In the operation of classifying the extracted text into a pre-classified item using a trained neural network model (S3000), the unstructured document analysis device 1000 may allocate text extracted from the unstructured document data into the pre-classified item. Specifically, the unstructured document analysis device 1000 may allocate the extracted text to the pre-classified item using the trained neural network model. For example, the unstructured document analysis device 1000 may be configured to allocate the extracted text to the pre-classified item by using a neural network model obtained by secondly training a firstly trained language model to predict a probability for a word sequence (or a sentence sequence).

The operation of classifying the extracted text into a pre-classified item according to an embodiment of the present disclosure (S3000) will be described in more detail below with reference to FIGS. 5 to 7. Specifically, the classification of the extracted text into the pre-classified item using the trained neural network model will be described with reference to FIGS. 5 and 6, and the training of the neural network model will be described in more detail with reference to FIG. 7.

Figure 5:
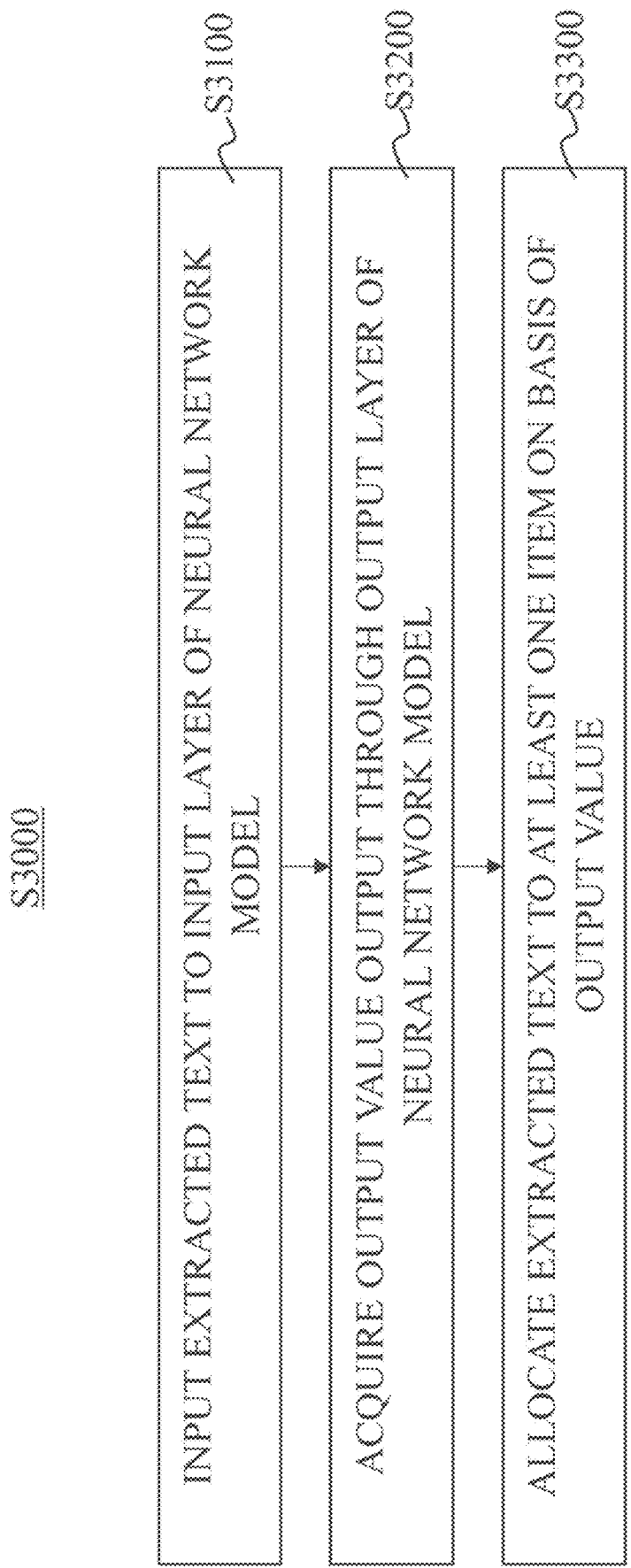
FIG. 5 is a detailed flowchart of an operation of classifying extracted text into pre-classified items according to an embodiment of the present disclosure.
Figure 6:
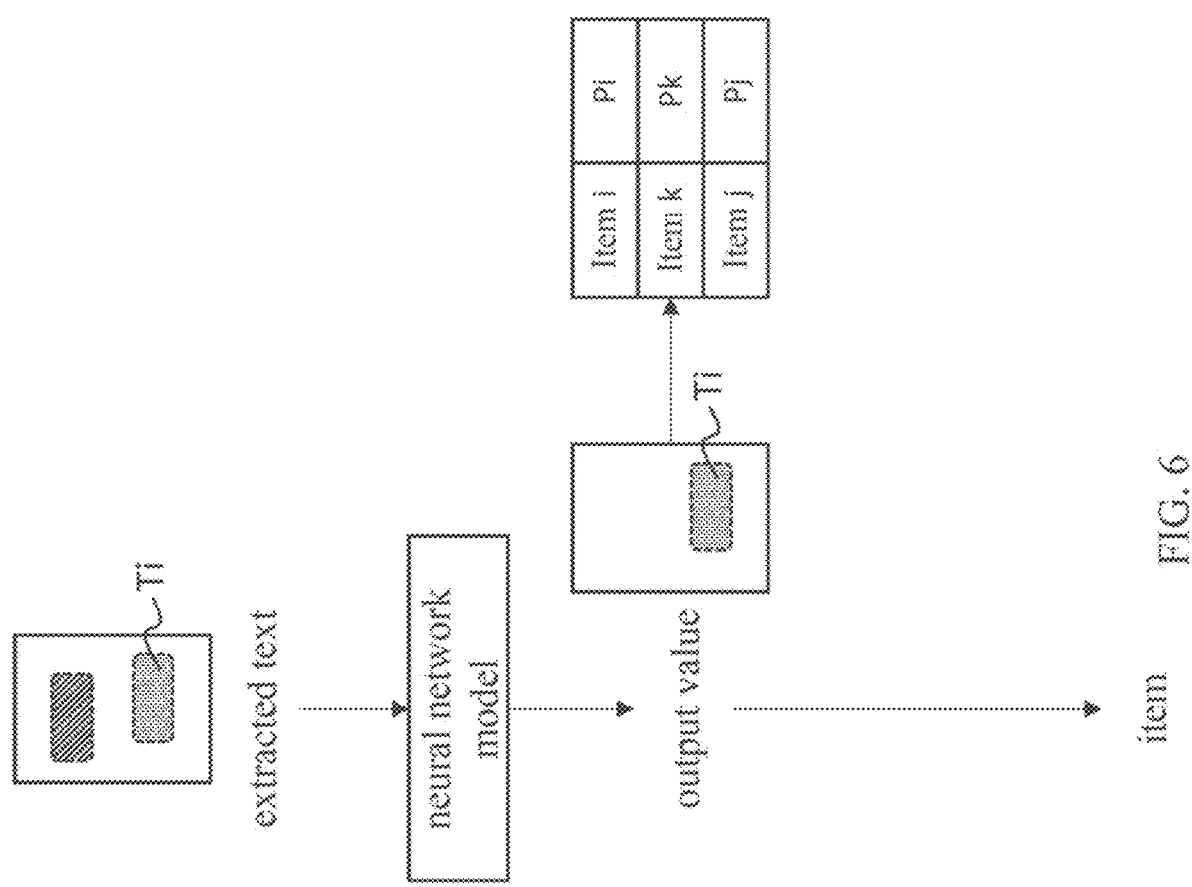
FIG. 6 is a diagram illustrating an aspect of classifying extracted text by pre-classified item according to an embodiment of the present disclosure.

FIG. 5 is a detailed flowchart of the operation of classifying extracted text into a pre-classified item (S3000) according to an embodiment of the present disclosure. FIG. 6 is a diagram illustrating an aspect of classifying extracted text by pre-classified item according to an embodiment of the present disclosure.

The operation of classifying the extracted text into a pre-classified item according to an embodiment of the present disclosure (S3000) may include operations of inputting the extracted text into an input layer of the neural network model (S3100), acquiring an output value output through an output layer of the neural network model (S3200), and allocating the extracted text to at least one item on the basis of the output value (S3300).

Specifically, the unstructured document analysis device 1000 may input the text extracted from the unstructured document data into the input layer of the trained neural network model (3100) and acquire an output value that is output through the output layer of the neural network model (S3200). Here, the output value may be a probability that the extracted text will be classified into at least one pre-classified item among the pre-classified items. Alternatively, the output value may be a value indicating an item with the highest probability among the pre-classified items. In this case, the unstructured document analysis device 1000 may allocate the extracted text into at least one of the pre-classified items on the basis of the output value (S3300).

For example, the unstructured document analysis device 1000 may input extracted text Ti to the input layer of the neural network model and acquire an output value (e.g., a probability for each pre-classified item) that is output through the output layer. Specifically, the output value may include at least one of a probability pi that the extracted text will correspond to an item i, a probability pj that the extracted text will correspond to an item j, and/or a probability pk that the extracted text will correspond to an item k. In this case, the unstructured document analysis device 1000 may compare the probabilities and allocate the extracted text to an item corresponding to the highest probability.

Figure 7:
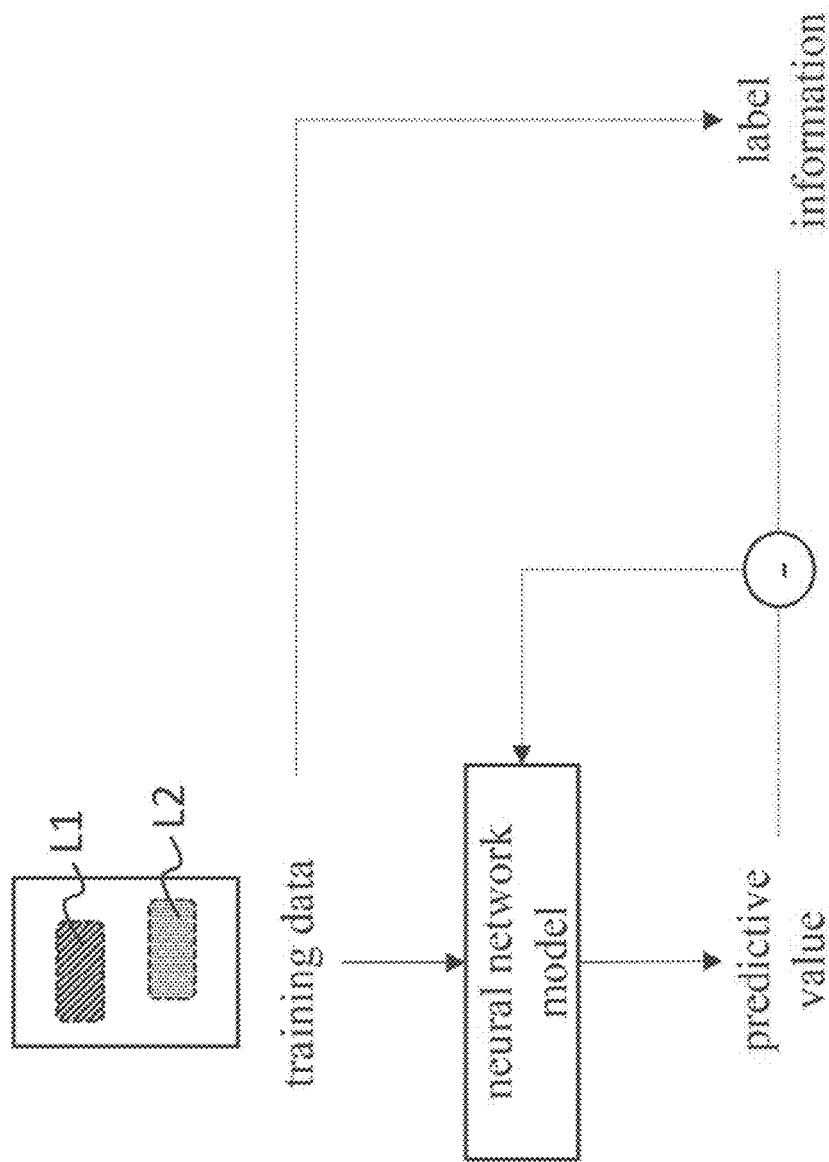
FIG. 7 is a diagram illustrating an aspect of training a neural network model according to an embodiment of the present disclosure.

FIG. 7 is a diagram illustrating an aspect of training a neural network model according to an embodiment of the present disclosure.

According to an embodiment, the neural network model may be trained using training data including text included in document data and label information related to an item allocated to the text. For example, the training data may include first text included in the document data and a first label L1 related to an item allocated to the first text. Also, the training data may include second text included in the document data and a second label L2 related to an item allocated to the second text.

In this case, the neural network model may be trained by acquiring training data through an input layer, outputting a predictive value through an output layer, and adjusting a parameter (or weight) of a node included in the neural network model on the basis of the predictive value and label information. For example, the neural network model may acquire the first text included in the training data through the input layer, output the predictive value through the output layer, and adjust the parameter of the node included in the neural network model such that the difference between the predictive value and the label information is decreased on the basis of the difference between the predictive value and the first label information L1. Similarly, the neural network model may acquire the second text included in the training data through the input layer, output the predictive value through the output layer, and adjust the parameter of the node included in the neural network model such that the difference between the predictive value and the label information is decreased on the basis of the difference between the predictive value and the second label information L2.

The trained neural network model may output an output value approximate to the label information related to the pre-classified item on the basis of the document data (e.g., text extracted from the document data). Specifically, the trained neural network may output a value for label information Li related to an item or a probability value to be classified with a specific label on the basis of text Ti included in the document data. Accordingly, the unstructured document analysis device 1000 may classify the extracted text into a pre-classified item using the trained network model.

According to an embodiment, as described above, the unstructured document analysis device 1000 may be configured to allocate the extracted text to the pre-classified item by using a neural network model obtained by secondly training a language model, which is firstly trained to predict a probability for a word sequence, to classify the extracted text by item. According to this embodiment, by additionally learning text classification using a language model with a high level of understanding of languages, it is possible to train a neural network model using a relatively small amount of training data, and the trained neural network model can classify text by item with excellent performance.

Referring back to FIG. 3, the unstructured document analysis method according to an embodiment of the present disclosure may include an operation of acquiring a content query related to content included in the unstructured document data and associated with a pre-classified item (S4000).

In the operation of acquiring a content query related to content included in the unstructured document data and associated with a pre-classified item (S4000), the unstructured document analysis device 1000 may acquire a content query. In this case, the content query may be an arbitrary query related to the content included in the unstructured document data. Also, the content query may be at least one query related to or associated with the pre-classified item. As an example, the unstructured document analysis device 1000 may acquire a content query on the basis of a user input for inputting a content query through a user terminal or selecting at least one of a plurality of content queries. As another example, the unstructured document analysis device 1000 may acquire a content query from template data. In this case, the unstructured document analysis device 1000 may acquire template data including a key to which item information corresponding to the pre-classified item is allocated and a value to which an answer to the content query will be allocated, acquire item information allocated to the key, and acquire a content query associated with the item on the basis of the item information.

Figure 8:
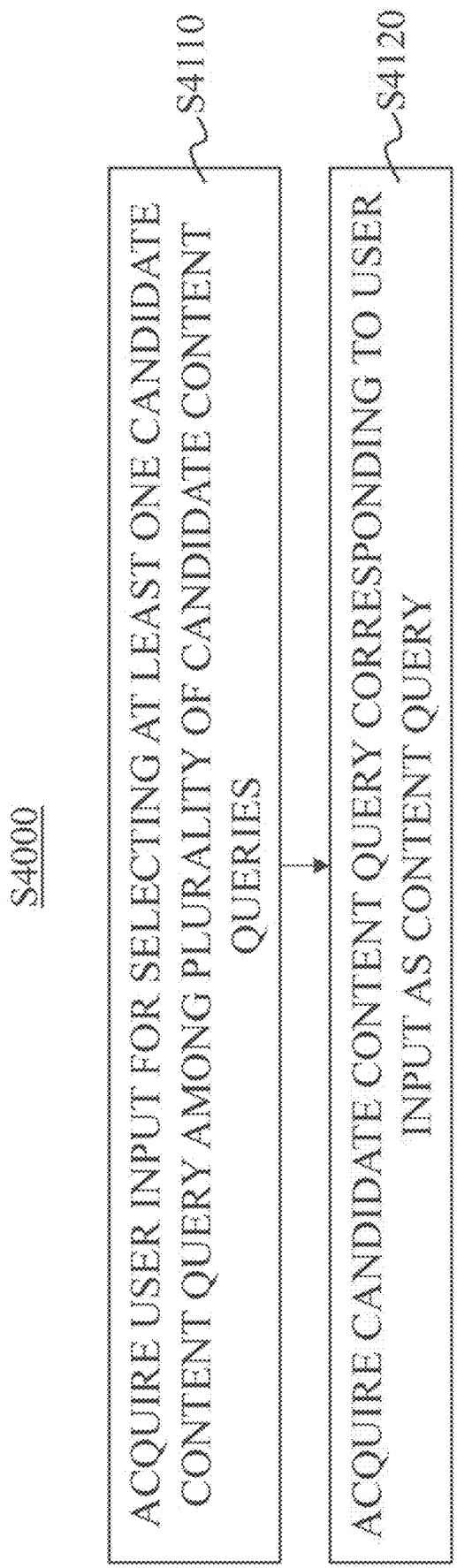
FIG. 8 is a detailed flowchart of an operation of acquiring a content query according to an embodiment of the present disclosure.
Figure 9:
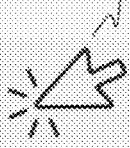
FIG. 9 is a diagram showing an aspect of acquiring a content query on the basis of a user input according to an embodiment of the present disclosure.

The acquisition of the content query according to embodiments of the present disclosure will be described in detail below with reference to FIGS. 8 to 11. FIG. 8 is a detailed flowchart of an operation of acquiring a content query (S4000) according to an embodiment of the present disclosure. FIG. 9 is a diagram showing an aspect of acquiring a content query on the basis of a user input according to an embodiment of the present disclosure.

The operation of acquiring a content query according to an embodiment of the present disclosure (S4000) may include operations of acquiring a user input for selecting at least one candidate content query among a plurality of candidate content queries (S4110) and acquiring a candidate content query corresponding to the user input as the content query (S4120).

In the operation of acquiring a user input for selecting at least one candidate content query among a plurality of candidate content queries (S4110), the unstructured document analysis device 1000 may acquire a user input for selecting at least one candidate content query among the plurality of candidate content queries through a user terminal (S4110). Specifically, a user may select at least one candidate content query (e.g., "What is length overall?" in FIG. 9) among the plurality of candidate content queries through an input unit (e.g., a mouse, a keyboard, a touchpad, etc.) of the user terminal. In this case, the unstructured document analysis device 1000 may acquire a candidate content query corresponding to the user input as a content query (S4120). However, this is only an example, and the unstructured document analysis device 1000 may be implemented to acquire a content query on the basis of a user input that is input in any form through an input unit of a user terminal. For example, a user may input a query through the input unit of the user terminal, and the unstructured document analysis device 1000 may be implemented to analyze similarity between the user's query and a content query for each pre-classified item and acquire a content query according to the similarity analysis.

Figure 10:
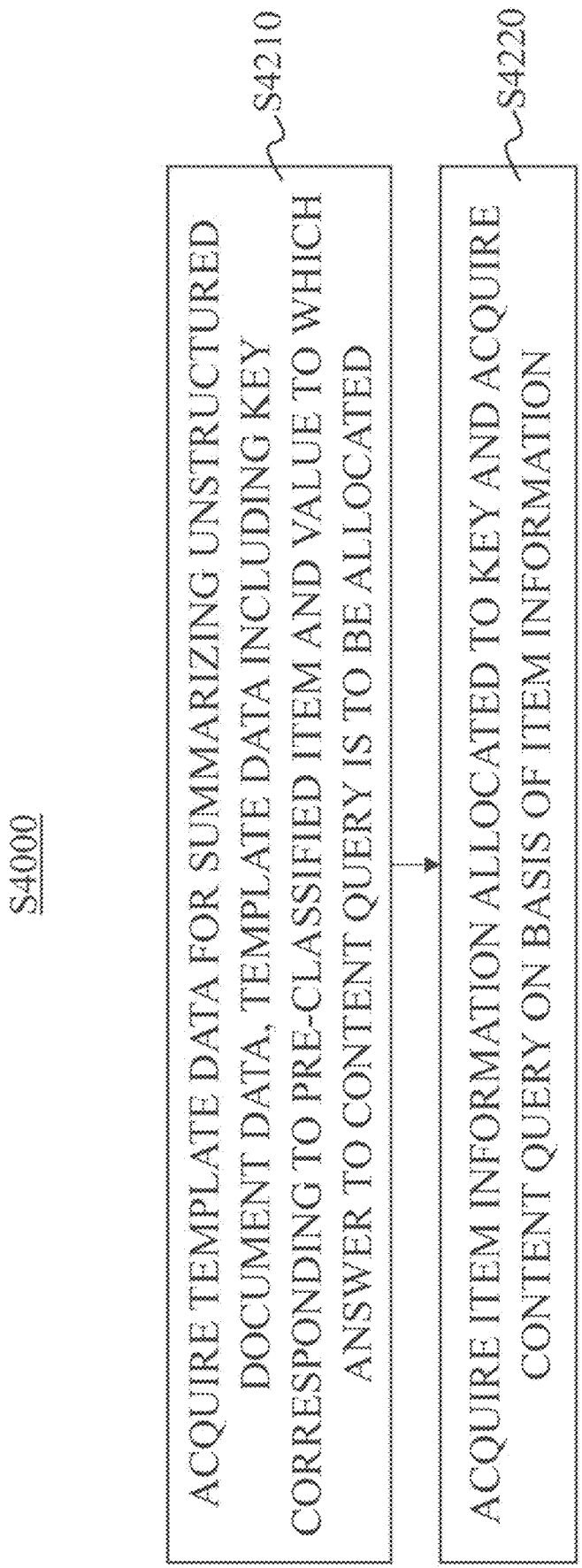
FIG. 10 is a detailed flowchart of an operation of acquiring a content query according to an embodiment of the present disclosure.

FIG. 10 is a detailed flowchart of an operation of acquiring a content query (S4000) according to an embodiment of the present disclosure. FIG. 11 is a diagram showing an aspect of acquiring a content query on the basis of template data according to an embodiment of the present disclosure.

The operation of acquiring a content query according to an embodiment of the present disclosure (S4000) may include operations of acquiring template data for summarizing the unstructured document data (S4210) and acquiring item information allocated to a key and acquiring a content query on the basis of the item information (S4220).

In the operation of acquiring template data for summarizing the unstructured document data (S4210), the unstructured document analysis device 1000 may acquire template data. For example, a user may input a template through an input unit (e.g., a mouse, a keyboard, a touchpad, etc.) of a user terminal, and the unstructured document analysis device 1000 may acquire template data on the basis of the user input. In this case, the template data may include a key to which item information related to the pre-classified item is allocated and a value to which an answer to the content query will be allocated. For example, when the unstructured document data is a share trading contract, template data for summarizing the share trading contract may include a key to which item information including a target company, a share type, a par value, the number of shares to be traded, a possession rate, a price per share, the total amount of trading, and the like is allocated. Also, the template data may include a value to which an answer corresponding to the item information is to be allocated. For example, an answer related to the name of a target company generated based on item information related to the target company may be allocated to the value of a share trading contract template.

In the operation of acquiring item information allocated to a key and acquiring a content query on the basis of the item information (S4220), the unstructured document analysis device 1000 may acquire the item information allocated to the key and acquire the content query on the basis of the item information. As an example, the unstructured document analysis device 1000 may acquire item information of the key included in the template data, e.g., item information related to a target company and may acquire a content query for asking about the name of the target company. As another example, the unstructured document analysis device 1000 may acquire item information of the key included in the template data, e.g., item information related to a share type and may acquire a content query for asking about the share type. In this case, each content query may be predefined for each corresponding piece of item information or may be pre-matched to the item information.

Referring back to FIG. 3, the unstructured document analysis method according to an embodiment of the present disclosure may include an operation of generating an answer to the content query on the basis of the extracted text allocated to the item (S5000).

In the operation of generating an answer to the content query on the basis of the extracted text allocated to the item (S5000), the unstructured document analysis device 1000 may generate an answer to the content query on the basis of extracted text allocated to a pre-classified item. Specifically, the unstructured document analysis device 1000 may be implemented to analyze the content query using machine reading comprehension (MRC) technology and determine an answer to the content query. The MRC refers to a technology that analyzes a random problem using an artificial intelligence algorithm and finds an optimal answer to the problem. For example, the unstructured document analysis device 1000 may analyze a correlation between the content query and the item and acquire extracted text allocated to an item with a high correlation as an answer to the content query. More specifically, the unstructured document analysis device 1000 may compute a first correlation between the content query and a first item and a second correlation between the content query and a second item, compare the first correlation and the second correlation, and acquire extracted text allocated to an item including the larger one as an answer to the content query. However, this is only an example, and the unstructured document analysis device 1000 may be implemented to generate an answer to the content query using any suitable method. For example, when a content query and an item are pre-matched, the unstructured document analysis device 1000 may generate an answer to the content query on the basis of extracted text allocated to the item matched to the content query.

A detailed embodiment of generating an answer to a content query will be described below with reference to FIGS. 12 and 13.

Figure 12:
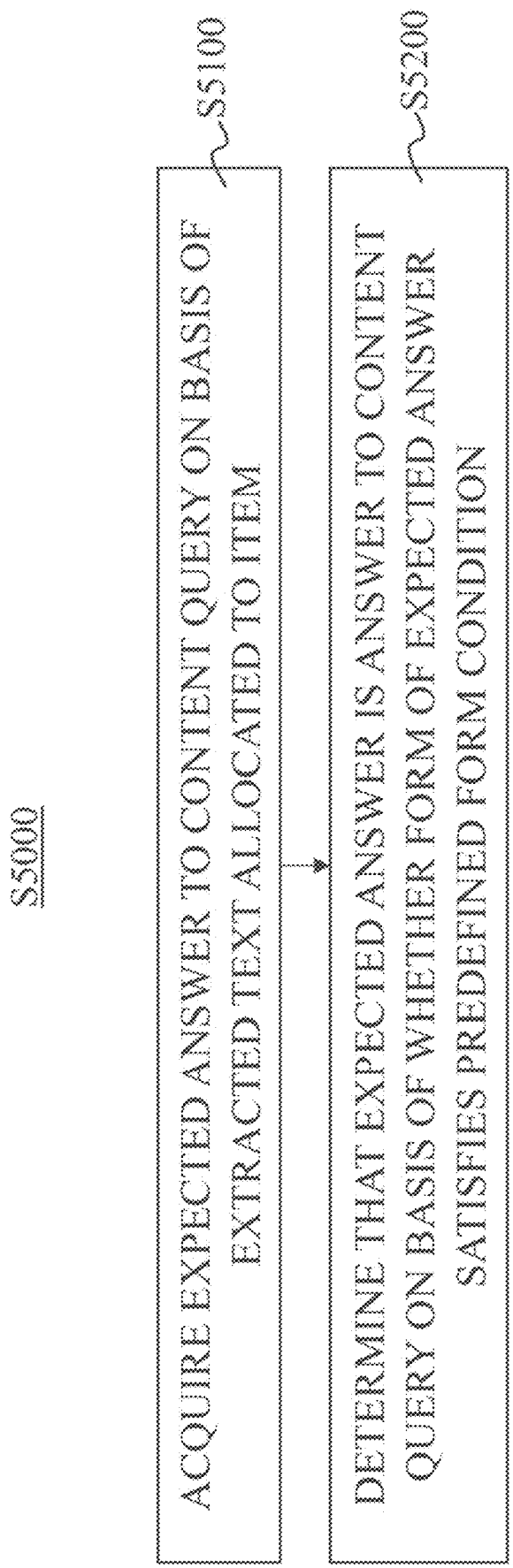
FIG. 12 is a detailed flowchart of an operation of generating an answer to a content query according to an embodiment of the present disclosure.

FIG. 12 is a detailed flowchart of an operation of acquiring an answer to the content query according to an embodiment of the present disclosure. FIG. 13 is a diagram showing an aspect of generating an answer to the content query according to an embodiment of the present disclosure.

The operation of generating an answer to the content query according to an embodiment of the present application (S5000) may include operations of acquiring an expected answer to the content query on the basis of the extracted text allocated to the item (S5100) and determining that the expected answer is the answer to the content query on the basis of whether the form of the expected answer satisfies a predefined form condition (S5200). According to this embodiment, the unstructured document analysis device 1000 can significantly increase the validity of the expected answer by determining a final answer to the content query on the basis of whether the expected answer to the content query satisfies the predefined form condition.

In the operation of acquiring an expected answer to the content query on the basis of the extracted text allocated to the item (S5100), the unstructured document analysis device 1000 may acquire the expected answer to the content query on the basis of the content query and the extracted text allocated to the item. As described above, the unstructured document analysis device 1000 may analyze the content query to acquire item information with a high correlation with the content query and may generate an expected answer to the content query using the extracted text allocated to the pre-classified item.

In the operation of determining that the expected answer is the answer to the content query on the basis of whether the form of the expected answer satisfies a predefined form condition (S5200), the unstructured document analysis device 1000 may determine that the expected answer is the answer to the content query according to whether the form of the expected answer satisfies the predefined form condition.

As an example, when the content query is for a specific date, the predefined form condition may be in the form of "$A^{th}$ month, $B^{th}$ day." In this case, when the form of the expected answer satisfies the predefined form condition, the unstructured document analysis device 1000 may determine that the expected answer is the answer to the content query. On the other hand, when the form of the expected answer does not satisfy the predefined form condition, the unstructured document analysis device 1000 may be implemented not to determine that the expected answer is the answer to the content query.

As another example, when the content query is item information related to a money amount (e.g., a par value, a price per share, etc.), the predefined form condition may be in the form of [A] won. In this case, when the form (e.g., 100 won, 75,000 won, etc. of FIG. 13) of the expected answer satisfies the predefined form condition ([A] won), the unstructured document analysis device 1000 may determine that the expected answer is the answer to the content query. On the other hand, when the form (e.g., 5,000 shares) of the expected answer does not satisfy the predefined form condition ([A] won), the unstructured document analysis device 1000 may be implemented not to determine that the expected answer is the answer to the content query.

Various form conditions corresponding to arbitrary item information may be predefined, and the unstructured document analysis device 1000 may compare the expected answer to the predefined form condition and may determine that the expected answer is the answer to the content query when the expected answer satisfies the predefined form condition. For example, the expected answer such as a share type, a par value, the number of shares to be traded, and a price per share of FIG. 13 satisfies the predefined form condition, and the unstructured document analysis device 1000 may determine that the corresponding expected answer is a final answer. On the other hand, when the possession rate (e.g., 35 won) of FIG. 13 does not satisfy the predefined form condition (e.g., C %), the unstructured document analysis device 1000 may not determine that an expected answer related to the possession rate is a final answer. In this case, the unstructured document analysis device 1000 may be implemented to re-perform a process of generating an answer to a content query related to the possession rate.

On the other hand, although not shown, the unstructured document analysis method according to an embodiment of the present disclosure may further include an operation of generating an analysis result for the unstructured document on the basis of the unstructured document data, the pre-classified item, the content query, and/or the answer to the content query. Specifically, the unstructured document analysis device 1000 may generate any form of template or generate an arbitrary table on the basis of the unstructured document data, the pre-classified item, the content query, and/or the answer to the content query. For example, the unstructured document analysis device 1000 may generate a template with the summarized unstructured document data by allocating a character string corresponding to the answer to the content query to the above-described value of the template data.

Also, the unstructured document analysis device 1000 may be implemented to visually display, and provide a user with, text included in the unstructured document data corresponding to the answer included in the unstructured document data in response to the content query or a user input for selecting an answer to the content query.

Also, when there is an error in the answer to the content query, the unstructured document analysis device 1000 may modify the answer to the content query on the basis of a user input for instructing correction of the error through a user terminal. Also, the unstructured document analysis device 1000 may update the neural network model or an arbitrary algorithm on the basis of a result of the modification.

Also, the unstructured document analysis device 1000 may provide a function of presetting or defining arbitrary values including items and form conditions.

With the unstructured document analysis method, the unstructured document analysis device, and the unstructured document analysis system according to embodiments of the present disclosure, by extracting text using font characteristic data or document structure data, it is possible to analyze an unstructured document in consideration of the structure or format of the unstructured document.

With the unstructured document analysis method, the unstructured document analysis device, and the unstructured document analysis system according to embodiments of the present disclosure, by classifying text by item using a neural network model, it is possible to efficiently and precisely analyze an unstructured document.

The unstructured document analysis method, the unstructured document analysis device, and the unstructured document analysis system according to embodiments of the present disclosure can be applied to a technical field that analyzes arbitrary documents including unstructured data. For example, the unstructured document analysis method, the unstructured document analysis device, and the unstructured document analysis system according to embodiments of the present disclosure can be used to analyze a legal document including a contract and a document including ship specification information. However, this is only an example, and the method, the device, and the system can be used to analyze arbitrary documents including unstructured data.

The above-described various operations of the unstructured document analysis device 1000 may be stored in the memory 1200 of the unstructured document analysis device 1000, and the processor 1300 of the unstructured document analysis device 1000 may be provided to perform operations stored in the memory 1200.

With the unstructured document analysis method, the unstructured document analysis device, and the unstructured document analysis system according to embodiments of the present disclosure, by extracting text using font characteristic data or document structure data, it is possible to analyze an unstructured document in consideration of the structure or format of the unstructured document.

With the unstructured document analysis method, the unstructured document analysis device, and the unstructured document analysis system according to embodiments of the present disclosure, by classifying text by item using a neural network model, it is possible to efficiently and precisely analyze an unstructured document.

Advantageous effects of the present invention are not limited to the aforementioned effects, and other advantageous effects that are not described herein will be clearly understood by those skilled in the art from the following description and the accompanying drawings.

The features, structures, and effects described in the above embodiments are incorporated into at least one embodiment of the present invention but are not necessarily limited to only one embodiment. Moreover, features, structures, and effects exemplified in one embodiment can easily be combined and modified for another embodiment and then carried out by those skilled in the art. Therefore, these combinations and modifications should be construed as falling within the scope of the present invention.

While the present invention has been described with reference to embodiments, these are just examples and do not limit the present invention. It will be understood by those skilled in the art that various modifications and applications may be made therein without departing from the essential characteristics of the embodiments. That is, elements described in the embodiments above in detail may be modified. Furthermore, differences associated with such modifications and applications should be construed as being included in the scope of the present invention defined by the appended claims.

What is claimed is:

1. An unstructured document analysis method that analyzes an unstructured document and generates an answer to a content query related to content included in the unstructured document, the unstructured document analysis method comprising operations of:
    acquiring unstructured document data including font characteristic data and document structure data;
    classifying the unstructured document data into a plurality of sectors when the font characteristic data included in the unstructured document data satisfies a predefined rule and extracting texts included in the unstructured document data for each of the plurality of sectors;
    classifying the extracted texts into pre-classified items using a trained neural network model;
    acquiring a content query related to the content included in the unstructured document data and associated with a pre-classified item among the pre-classified items; and
    generating an answer to the content query on the basis of the extracted texts classified into the pre-classified items,
    wherein the operation of acquiring the content query comprises operations of:
    acquiring template data for summarizing the unstructured document data, the template data including a plurality of pre-classified items, keys and values, wherein a plurality of pieces of item information corresponding to the plurality of pre-classified items are allocated to the keys, and a plurality of answers corresponding to the plurality of pieces of item information are allocated to the values, and the plurality of pieces of item information are matched with the plurality of answers, respectively, and
    recognizing item information corresponding to the pre-classified item and allocated to a key among the keys and acquiring the content query on the basis of the item information,
    wherein a plurality of form conditions corresponding to the plurality of pieces of item information are pre-defined, and
    wherein the operation of generating the answer to the content query comprises operations of:
    calculating a correlation between each of pre-classified items by the trained neural network model,
    acquiring an expected answer to the content query on the basis of a text classified as a pre-classified item with the highest correlation among the pre-classified items,
    comparing the expected answer with a predefined form condition of the plurality of form conditions, and
    determining that the expected answer is the answer to the content query based on a form of the expected answer satisfying the predefined form condition.

2. The unstructured document analysis method of claim 1, wherein the operation of classifying the extracted texts into the pre-classified items comprises operations of:
    inputting an extracted text among the extracted texts into an input layer of the neural network model;
    acquiring an output value output through an output layer of the neural network model, the output value being a probability that the extracted text is to be related to at least one item; and
    allocating the extracted text to the at least one item on the basis of the output value.

3. The unstructured document analysis method of claim 2, wherein the neural network model is trained by acquiring training data through the input layer, outputting an output value through the output layer, and adjusting a parameter of a node included in the neural network model on the basis of the output value and a label related to an item allocated to reference text included in the training data.

4. The unstructured document analysis method of claim 1, wherein
    the font characteristic data includes data related to at least one of a font size, a font thickness, a font shape, a font position, a font writing direction, a font color, and a font format, and the document structure data includes data related to at least one of text, an image, a table of contents, a table, a graph, a drawing, a list, a creator, a header, a footer, a query, an answer, a title, and the level of title.

5. The unstructured document analysis method of claim 1, wherein the plurality of sectors include a title sector and a body sector,
the operation of classifying comprises classifying the unstructured document data into the title sector or the body sector according to whether the font characteristic data satisfies the predefined rule.

6. The unstructured document analysis method of claim 5, wherein
the operation of classifying the unstructured document data into the title sector or the body sector comprises an operation of classifying the unstructured document data into the title sector when the font characteristic data satisfies a first predefined rule and classifying the unstructured document data into the body sector when the font characteristic data satisfies a second predefined rule, and
the first rule and the second rule are rules related to font characteristics.

7. The unstructured document analysis method of claim 1, wherein the operation of acquiring the content query comprises operations of:
acquiring a user input for selecting at least one candidate content query among a plurality of candidate content queries; and
acquiring a candidate content query corresponding to the user input as the content query.

8. The unstructured document analysis method of claim 1, wherein the operation of generating the answer to the content query comprises an operation of allocating the answer to the value and generating an analysis template for the unstructured document data.

9. A non-transitory computer-readable recording medium containing instructions for causing a computer to execute a method according to claim 1.

10. An unstructured document analysis device for analyzing an unstructured document and generating an answer to a content query related to content included in the unstructured document, the unstructured document analysis device comprising:
a memory storing instructions;
a processor configured to execute the instructions to:
acquire unstructured document data including font characteristic data and document structure data,
classify the unstructured document data into a plurality of sectors when the font characteristic data included in the unstructured document data satisfies a predefined rule and extract texts included in the unstructured document data for each of the plurality of sectors,
classify the extracted texts into pre-classified items using a trained neural network model, acquires a content query related to the content included in the unstructured document data and associated with a pre-classified item among the pre-classified items, and
generate an answer to the content query on the basis of the extracted texts classified into the pre-classified items,
wherein the processor is further configured to execute the instructions to:
acquire template data for summarizing the unstructured document data, the template data including a plurality of pre-classified items, keys and values, wherein a plurality of pieces of item information corresponding to the plurality of pre-classified items are allocated to the keys, and a plurality of answers corresponding to the plurality of pieces of item information are allocated to the values, and the plurality of pieces of item information are matched with the plurality of answers, respectively, and
recognize item information corresponding to the pre-classified item and allocated to a key among the keys and acquiring the content query on the basis of the item information,
wherein a plurality of form conditions corresponding to the plurality of pieces of item information are pre-defined, and
wherein the processor is further configured to execute the instructions to:
calculate a correlation between each of pre-classified items by the trained neural network model,
acquire an expected answer to the content query on the basis of a text classified as a pre-classified item with the highest correlation among the pre-classified items,
compare the expected answer with a predefined form condition of the plurality of form conditions, and
determine that the expected answer is the answer to the content query based on a form of the expected answer satisfying the predefined form condition.

11. The unstructured document analysis device of claim 10,
wherein the processor is further configured to execute the instruction to:
input an extracted text among the extracted texts into an input layer of the neural network model;
acquire an output value output through an output layer of the neural network model, the output value being a probability that the extracted text is to be related to at least one item; and
allocate the extracted text to the at least one item on the basis of the output value.

12. The unstructured document analysis device of claim 11, wherein the neural network model is trained by acquiring training data through the input layer, outputting an output value through the output layer, and adjusting a parameter of a node included in the neural network model on the basis of the output value and a label related to an item allocated to reference text included in the training data.

13. The unstructured document analysis device of claim 11, wherein
the font characteristic data includes data related to at least one of a font size, a font thickness, a font shape, a font position, a font writing direction, a font color, and a font format, and
the document structure data includes data related to at least one of text, an image, a table of contents, a table, a graph, a drawing, a list, a creator, a header, a footer, a query, an answer, a title, and the level of title.

14. The unstructured document analysis device of claim 12, wherein the plurality of sectors include a title sector and a body sector,
wherein the processor is further configured to execute the instruction to:
classify the unstructured document data into the title sector or the body sector according to whether the font characteristic data satisfies the predefined rule.

15. The unstructured document analysis device of claim 14,
wherein the processor is further configured to execute the instruction to:

classify the unstructured document data into the title sector when the font characteristic data satisfies a first predefined rule, and classify the unstructured document data into the body sector when the font characteristic data satisfies a second predefined rule, and wherein the first rule and the second rule are rules related to font characteristics.

16. The unstructured document analysis device of claim 10, wherein the processor is further configured to execute the instruction to:

acquire a user input for selecting at least one candidate content query among a plurality of candidate content queries; and acquire a candidate content query corresponding to the user input as the content query.

17. The unstructured document analysis device of claim 10, wherein the processor is further configured to execute the instruction to allocate the answer to the value and generate an analysis template for the unstructured document data.

18. The unstructured document analysis device of claim 10, wherein the processor is further configured to execute the instruction to:

acquire a user input for instructing correction of an error in the determined answer, modify the error in the determined answer on the basis of the user input, and update the neural network mode on the basis of a result of the modification.

* * * * *